United States Patent [19]
Sato

[11] 4,235,510
[45] Nov. 25, 1980

[54] BINOCULARS WITH COVER MEMBERS
[75] Inventor: Akira Sato, Tokyo, Japan
[73] Assignee: Nippon Kogaku K.K., Tokyo, Japan
[21] Appl. No.: 25,543
[22] Filed: Mar. 30, 1979
[30] Foreign Application Priority Data
Mar. 31, 1978 [JP] Japan .................. 53-36554
[51] Int. Cl.² .................. G02B 7/06; G02B 23/18
[52] U.S. Cl. .................. 350/76; 350/67
[58] Field of Search .................. 350/67, 75, 76, 77, 350/36, 57; D16/59-63; 150/52 J
[56] References Cited

U.S. PATENT DOCUMENTS

| 1,967,738 | 7/1934 | Boydston | 350/76 |
| 2,372,479 | 3/1945 | French | 350/57 |
| 2,393,339 | 1/1946 | Russell | 350/75 |
| 3,020,802 | 2/1962 | Rantsch et al. | 350/57 |
| 3,033,079 | 5/1962 | Haupt et al. | 150/52 J |
| 3,829,194 | 8/1974 | Van Exel et al. | 350/76 |

FOREIGN PATENT DOCUMENTS

275389 8/1927 United Kingdom .................. 350/77

*Primary Examiner*—Jon W. Henry
*Attorney, Agent, or Firm*—Fitzpatrick, Cella, Harper & Scinto

[57] ABSTRACT

In binoculars, a plastic cover contains therein substantially all of the portions of the binoculars except the openings of holding cylinders and the operating knob. The cover comprises left and right cover members rotatable about a central shaft integrally with the left and right holding cylinders, respectively.

4 Claims, 5 Drawing Figures

BINOCULARS WITH COVER MEMBERS

BACKGROUND OF THE INVENTION

1. Field of the Invention

This invention relates to binoculars, and more particularly, to the outer shell portion of binoculars.

2. Description of the Prior Art

In conventional binoculars, the optical systems and the sliding mechanisms for the optical systems have been accommodated within a body formed of aluminum alloy diecast into a predetermined shape substantially complementary to the outer configuration of the binoculars. The external appearance of the binoculars has been determined by such processes as plating the body of aluminum alloy or applying material such as artificial leather to the holding portion. Therefore, physical blows or the like have been directly imparted to the body readily to damage the same, and once so damaged, the body has been difficult to repair. Moreover, the plating often eventually peeled off due to wear or friction and this too has been difficult to repair.

SUMMARY OF THE INVENTION

We have conceived and contribute by the present invention binoculars of a construction according to which we are able to overcome the above-noted difficulties and disadvantages peculiar to the conventional binoculars and to provide binoculars having a body which is not easily damaged, and an outer shell which readily permits repair.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
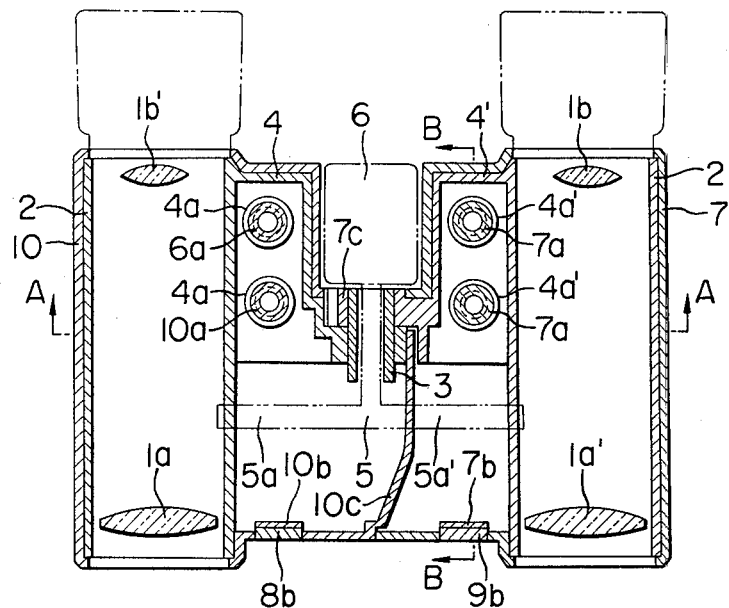
FIG. 1 is a cross-sectional view of an embodiment of the present invention.
Figure 2:
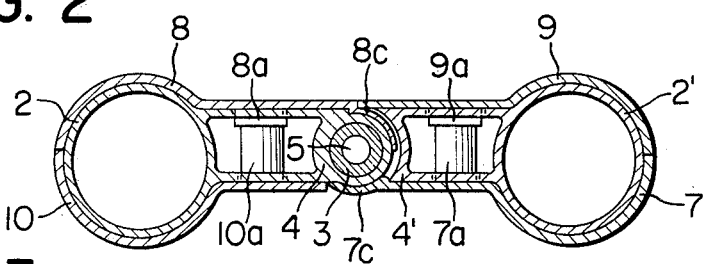
FIG. 2 is a cross-sectional view taken along line A—A in FIG. 1.
Figure 3:
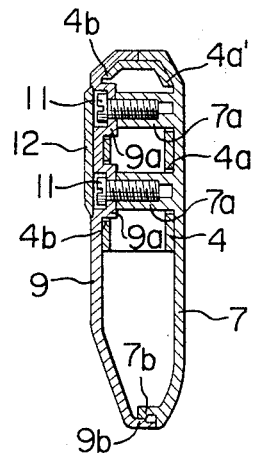
FIG. 3 is a cross-sectional view taken along line B—B in FIG. 1.

Referring to FIGS. 1 to 3, there is shown an embodiment of the present invention wherein an optical system including an objective lens $1a$ and an eyepiece $1b$ and an optical sytem including an objective lens $1a'$ and an eyepiece $1b'$ are parallel to each other and are accommodated within holding cylinders 2 and $2'$, respectively. A central shaft 3 lies midway between the cyllinders 2 and $2'$, which cylinders are rotatably coupled to the central shaft 3 by coupling means 4 and $4'$.

A sliding mechanism 5 may be of the well-known type and has arms $5a$ and $5a'$ linerally movable axially of the central shaft 3 upon rotation of an operating knob 6. The arms $5a$ and $5a'$ are coupled to a portion of the objective lenses $1a$ and $1a'$ by means (not shown) and distance adjustment may be accomplished by moving the arms $5a$ and $5a'$ in the direction parallel to the optic axis. Each holding cylinder 2 or $2'$ and each coupling means 4 or $4'$, respectively, may be formed integrally by diecasting aluminum alloy or like material. Members 7, 8, 9 and 10, appearing chiefly in FIG. 2, are covers formed of plastic and cover the outer surfaces of the holding cylinders 2, $2'$, the central shaft 3, the coupling means 4, $4'$ and the sliding mechanism 5. These covers 7, 8, 9 and 10 are preformed into a predetermined outer shell shape. The lower covers 7 and 10 are provided with projections $7a$ and $10a$ formed with threaded holes and tabs $7b$ and $10b$ for fitting. The covers 9 and 8 opposed to the covers 7 and 10 have projections $9a$, $8a$ and $9b$, $8b$ formed at locations opposed to the projections $7a$, $10a$ and the tabs $7b$, $10b$, the projections $9a$ and $8a$ being formed with holes. These covers 7, 8, 9 and 10 are applied over the holding cylinders 2, $2'$, the central shaft 3, the coupling means 4, $4'$ and the sliding mechanism 5 by fitting together the tabs $8b$, $10b$ and $7b$, $9b$ and fitting the projections $7a$, $10a$ of the covers 7, 10 into holes $4a$, $4a'$ formed in the coupling means 4, $4'$ and fitting the projections $8a$, $9a$ of the covers 8, 9 into holes $4b$ formed in the coupling means 4, and by threading screws 11 into the aforementioned threaded holes of the projections $7a$, $10a$. Designated by 12 is a false plate for covering the heads of the screws.

One end of each of the covers 7, 8, 9 and 10 are formed with a curved surface portion $7c$, $8c$, $9c$, $10c$ (only $9c$ does not appear in the drawing). These curved surface portions $7c$, $8c$, $9c$, $10c$ are intended to prevent the internal mechanism including the central shaft 3 from being exposed when the left and right holding cylinders 2, $2'$ are rotated about the central shaft 3 of the binoculars to adjust the eye span of the binoculars. That is, in the position of FIG. 2, the curved surface portion $8c$ formed in the cover 8 is accommodated within and overlapped by the cover 9 lying on the same side and is not exposed, while the curved surface portion $7c$ formed in the cover 7 is exposed to cover the lower side of the coupling means 4 fitted to the central shaft 3. On the other hand, when the left and right holding cylinders 2, $2'$ are rotated downwardly about the central shaft 3, the curved surface portion $8c$ becomes exposed to prevent the internal mechanism including the central shaft 3 from being exposed.

Figure 4:
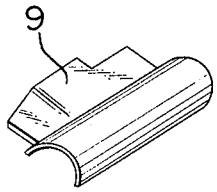
FIG. 4 is a perspective view of the cover shown in FIG. 1.
Figure 5:
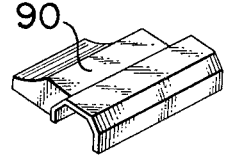
FIG. 5 is a perspective view showing another embodiment of the cover.

The binoculars of the present invention is excellent in shock resistance because the internal mechanism thereof is always protected by plastic covers. Also, according to the present invention, only the necessary minimum portion supporting the optical systems and the sliding mechanism thereof may be formed by diecasting; and moreover, the plastic forming the covers is light in weight and the simple detachability of the covers leads to an advantage that the covers, if damaged, may be readily replaced by new ones. Further, if a cover such as cover 90 configured as shown in FIG. 5 which differs from the cover 9 of the present embodiment as shown in FIG. 4 or several types of covers differing in color from the cover of FIG. 4 are prepared, the user will be able selectively to use covers of his favorite color and shape while using the same main body. Additionally, as shown in the illustrated embodiment, the cover is formed of a plurality of pieces corresponding to the left and right holding cylinders and therefore, adjustment to the eye span can be accomplished without the unsightliness of the exposed internal mechanism.

I believe that my novel binocular construction will now be understood and that the several advantages thereof will be fully appreciated by those persons skilled in the art.

I claim:

1. In binoculars including left and right parallel optical systems each including an objective lens and an eyepiece, left and right holding cylinders accommodating therewithin said optical systems, respectively, a central shaft disposed equidistantly from said left and right optical systems, left and right coupling means for rotatably coupling said holding cylinders to said central shaft, a mechanism including operating means for simultaneously moving predetermined portions of said left and right optical systems to effect distance adjustment, and wherein said holding cylinders, said coupling means and said mechanism are adapted to be rotated about said central shaft, the improvement comprising a plastic cover for containing therein substantially all of the portions except the openings of said holding cylinders and said operating knob, said cover comprising left and right separate cover members which rotate about said central shaft integrally with said left and right holding cylinders, respectively, wherein surfaces of said left and right cover members overlap so as to be in reverse relationship, the inner overlapped portion being formed as an inwardly curved surface gradually to be separated from the outer overlapped portion.

2. Binoculars according to claim 1, wherein said left and right cover members are further separated into upper and lower cover members, and said upper and lower cover members are fastened together by fastening means extending through an opening formed in said coupling means.

3. In binoculars including left and right parallel optical systems each including an objective lens and an eyepiece, left and right holding cylinders accommodating therewithin said optical systems, respectively, a central shaft disposed equidistantly from said left and right optical systems, coupling means for coupling said holding cylinders to said shaft, and means for moving said left and right holding cylinders in parallel with said central shaft to effect a distance adjustment; the improvement comprising two pairs of cover members formed of deformation resistant material, each pair including upper and lower elements complimentary to each other, said pairs covering said holding cylinders, respectively.

4. Binoculars according to claim 3, wherein said cover members are formed of plastic.

* * * * *